ated Jan. 12, 1960

2,920,933
PROCESS FOR PRODUCING FAST PRINTS

Ernst Fischer, Offenbach (Main), Germany, assignor to Farbwerke Hoechst Aktiengesellschaft vormals Meister Lucius & Brüning, Frankfurt am Main, Germany, a corporation of Germany No Drawing. Application September 14, 1955
Serial No. 534,401

Claims priority, application Germany September 18, 1954

2 Claims. (Cl. 8—71)

The present invention relates to a process for producing fast pink and red prints with ice-colors.

In cloth printing according to the ice-color method on native or regenerated cellulose it has not been possible hitherto to produce brilliant pink or bright red shades, as they are obtained for example with dyestuffs of the rhodamine series, with the use of 2.3-hydroxynaphthoyl-aminobenzene or a 1-(2'.3'-hydroxynaphthoylamino)-2-alkylbenzene or -2-alkoxybenzene which are mainly used in industry for this purpose, and the diazonium compound from a suitable primary aromatic amine. For the production of such tints, therefore, basic dyestuffs of this kind were used which are applied to the fiber with a tannic acid mordant. These basic dyestuffs, however, differ considerably from the ice-colors with regard to their application so that the simultaneous use of these two dyestuff classes gives rise to complications, particularly the number of operations is increased.

Now I have found that vivid pink and red prints similar to those produced with the rhodamines can also be obtained with ice-colors according to a printing process usual for this class of dyestuffs by combining the diazonium compound from 1-amino-2-methoxybenzene-5-carboxylic acid amide with an arylamide of 2.3-hydroxynaphthoic acid of the general formula:

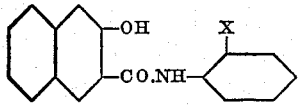

wherein X represents a hydrogen atom, an alkyl or an alkoxy group.

The prints so produced are superior to normal prints produced with rhodamine dyestuffs with regard to their fastness to light.

In German Patent No. 899,538 it is stated that valuable water-insoluble monoazo-dyestuffs are obtained by coupling the diazonium compound from a 1-amino-2- alkoxybenzene-5-carboxylic acid amide with a 2.3-hydroxynaphthoic acid arylamide of a definite constitution. The 2.3-hydroxynaphthoic acid arylamides described in that patent differ from 2.3-hydroxynaphthoyl-aminobenzene and the 1-(2'.3'-hydroxynaphthoylamino)-2-alkylbenzenes and -2-alkoxybenzenes with regard to their chemical structure by the presence of several substituents in the arylamide radical, which gives rise to a higher substantivity of these 2.3-hydroxynaphthoic acid arylamides. It is, therefore, extremely difficult to remove the grounding component from non-printed spots by washing out, as it is necessary for example in the production of ice-colors according to the base printing method. Contrary thereto, it is much less difficult to wash out an impregnation produced with 2.3-hydroxynaphthoyl-aminobenzene, 1-(2'.3'-hydroxynaphthoylamino)-2-alkylbenzenes or -2-alkoxybenzenes, since these 2.3-hydroxynaphthoic acid arylamides which have only a low substantivity, can be removed from the non-printed spots by washing for a short time, so that a clear white ground is obtained.

By using the 2.3-hydroxynaphthoic acid arylamides described in German Patent No. 899,538 under the same washing conditions the ground is stained a strongly yellowish tint by residues of the grounding component and there is the risk that it turns brown by the action of light:

The following examples serve to illustrate the invention, but they are not intended to limit it thereto:

Example 1

Bleached cotton cloth is padded with the following solution and dried:

12 grams of 2.3-hydroxynaphthoylaminobenzene are made into a paste with
20 grams of Turkey red oil of 50 percent strength, and
18 cc. of sodium hydroxide solution of 38° Bé. and the whole is made up to 1 liter with boiling water.

The dried cloth is printed with a printing paste which is prepared as follows:

5 grams of 1-amino-2-methoxybenzene-5-carboxylic acid amide are diazotized in the cold in
100 cc. of water with
12 cc. of hydrochloric acid of 20° Bé. and
2.4 grams of sodium nitrite. The diazo-solution so obtained is then neutralized with
10 grams of sodium acetate, mixed with
10 cc. of acetic acid of 50 percent strength, stirred into
500 grams of a neutral starch-tragacanth thickening and then made up to 1 kilogram with cold water.

The material is then dried, washed with a hot dilute sodium carbonate solution, soaped near the boiling temperature, rinsed and dried. A bright bluish red print is obtained which is distinguished by a clear white ground and good fastness properties.

By using 1-(2'.3'-hydroxynaphthoylamino)-2-methylbenzene or -2-methoxybenzene instead of 2.3-hydroxynaphthoylaminobenzene, a print of a similar tint and similar good properties of fastness is produced.

Example 2

Bleached cotton cloth is padded with the following solution and dried:

12 grams of 2.3-hydroxynaphthoylaminobenzene are made into a paste with
20 cc. of Turkey red oil of 50 percent strength and
18 cc. of sodium hydroxide solution of 38° Bé. and then made up to 1 liter with boiling water.

The dried material is printed with a printing paste which has been prepared as follows:

1.5 grams of 1-amino-2-methoxybenzene-5-carboxylic acid amide are diazotized in the cold in
30 cc. of water with
3.6 cc. of hydrochloric acid of 20° Bé. and
0.7 gram of sodium nitrite. The diazo-solution so obtained is then neutralized with
3 grams of sodium acetate, mixed with
10 cc. of acetic acid of 50 percent strength, stirred into
500 grams of a neutral starch-tragacanth-thickening and then made up to 1 kilogram by adding cold water.

The material is then dried, washed with a hot dilute sodium carbonate solution, soaped near the boiling temperature, rinsed and dried. A vivid pink print is obtained which is distinguished by a clear white ground. With regard to the fastness properties it is superior to prints of comparable shade produced with basic dyestuffs, for example, rhodamines.

By using 1-(2'.3'-hydroxynaphthoylamino)-2-methylbenzene or -2-methoxybenzene instead of 2.3-hydroxynaphthoylaminobenzene, a print of similar tint and similar good properties of fastness is produced.

The above printing process can also be used for printing other styles of fabric, for example viscose rayon or staple fibers of regenerated cellulose.

I claim:

1. In the grounding-printing method of producing prints on cellulosic fibers with ice-colors and employing a diazonium compound from 1-amino-2-methoxybenzene-5-carboxylic acid amide, the improvement resulting in the production of fast pink and red prints which comprises utilizing an arylamide of 2.3-hydroxynaphthoic acid of the general formula:

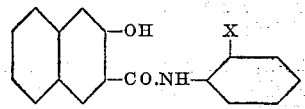

wherein X represents a member of the group consisting of hydrogen, methyl and methoxy as the coupling component for the said diazonium compound.

2. A process as claimed in claim 1, wherein 2.3-hydroxynaphthoylaminobenzene is used as the arylamide of 2.3-hydroxynaphthoic acid.

References Cited in the file of this patent
UNITED STATES PATENTS 2,742,459     Fischer _____ Apr. 17, 1956

OTHER REFERENCES

Venkataraman: The Chem. of Synthetic Dyes, Acad. Press Inc., N.Y., 1952, vol. 1, pp. 673, 675.

Lubs: The Chem. of Synthetic Dyes and Pigments, Reinhold Pub. Corp., N.Y., 1955, pp. 183, 184, 186, 189.

J. Soc. Dyers and Co., for August 1948, pp. 270, 271.

"Principles and Prac. of Textile Printing," by Knecht and Fothergill 4th ed., 1952, pub. in London by C. Griffin and Co., pp. 531, 540–544.